United States Patent
Ishiguro et al.

[19]

[11] Patent Number: 6,157,018
[45] Date of Patent: Dec. 5, 2000

[54] OMNI DIRECTIONAL VISION PHOTOGRAPH DEVICE

[76] Inventors: Hiroshi Ishiguro, 1-3 Takanotadehara-cho, Sakyo-ku, Kyoto; Osamu Nishihara, 3-18-18-406 Kandaiji, kanagawa-ku, Yokohama, both of Japan

[21] Appl. No.: 09/106,794

[22] Filed: Jun. 29, 1998

[30] Foreign Application Priority Data

Dec. 13, 1997 [JP] Japan ................................. 9-362709

[51] Int. Cl.$^7$ .................................................. H04N 7/00
[52] U.S. Cl. .......................................... 250/208.1; 348/36
[58] Field of Search .............................. 250/208.1, 208.6, 250/216, 239; 348/36, 37, 38, 39, 143

[56] References Cited

U.S. PATENT DOCUMENTS

| | | | |
|---|---|---|---|
| 5,760,826 | 6/1998 | Nayar ......................................... | 348/36 |
| 5,920,337 | 7/1999 | Galssman et al. ................... | 250/208.1 |

OTHER PUBLICATIONS

Forefront of Automation Technology; "Development of Omnidirectional Visual Sensor for Movable Robot"; Issei Yamazawa, et al.—with English Explanation, 1997.

Omnidirectional Visual Sensor Using Hyperboloidal Mirror; Hyper Omni Vision; "Camera capable of taking pictures of 360° in girth in real time"; Issei Yamazawa, et al.—with English Explantation, Nov. 1996.

News Release; "Development of 360° Visual System" Capable of Enlarging Images to Attract Attention; Mitsubishi Electric Co., Ltd., Jul. 1996.

"Omnicamera: Omnidirectional Video Camera"; Comments to Omnicamera; 1997, Columbia University.

The ParaCamera System by CycloVision Technologies, Inc.; "360° Real–Time Video".

*Primary Examiner*—Seungsook Ham
*Assistant Examiner*—Kevin Pyo
*Attorney, Agent, or Firm*—Nields & Lemack

[57] ABSTRACT

An omnidirectional vision sensor, which consists of a rotationally symmetrical convex mirror and a camera arranged opposite to the mirror, with clear and high quality image without having any disturbance due to the internal reflection of the light raised on the inner surface of the cylinder. The rays of light which internally reflect inside the cylinder pass through the production line of the rotational axis of the convex mirror, and thus these rays are eliminated before they reach the inner surface of the transparent cylinder. A tapered object on the vertex of the convex mirror is used to completely eliminate inner reflected rays of light.

16 Claims, 6 Drawing Sheets

OMNI DIRECTIONAL VISION PHOTOGRAPH DEVICE

FIELD OF THE INVENTION

This invention is related to a photography instrument, which is capable of taking a photograph of 360° view around the optical axis of camera.

BACKGROUND OF THE INVENTION

Previously, there has been a device to view the 360° vision around the optical axis of a camera by placing a rotationally symmetrical convex mirror opposite to a camera. This convex mirror reflects and gathers the rays of light to the camera so that the camera can record or photograph the entire 360° surroundings. In this type of the device, the convex mirror and camera are connected by a transparent cylinder.

Although this type of the device can record the omnidirectional vision, its structure has a disadvantage to gather the internally reflected light raised inner surface of the transparent cylinder, resulting in poor image quality and this design prevents putting this device into practical use.

Referring to these facts, the aim of this invention is to provide the photography instrument with clear and high image quality by excluding the internally reflected rays of light raised inner surface of the transparent cylinder completely.

SUMMARY OF THE INVENTION

This invention is established based on the fact that provided the rotational axis of the transparent cylinder and the rotational axis of the convex mirror coincide with each other, the rays of light which will be reflected on the inner surface of the transparent cylinder always intersect with the production line of the rotational axis of the convex mirror prior to the rays of light reaching the surface of the mirror, after being reflected on the inner surface of the transparent cylinder.

Therefore, this invention manages to eliminate these rays of light completely before it reflects internally by arranging a device along the common axis of the convex mirror and the transparent cylinder, hence any internal reflection can be prevented completely.

In other words, this invention consists of a rotationally symmetrical mirror, of a camera placed opposite to the mirror surface, of a transparent cylinder which connects the mirror and the camera together, and of a tapered object at the vertex of the convex mirror.

Its speciality is that to have a tapered internal light eliminator fixed on top of the convex mirror, along the axes of both the convex mirror and the camera described above with its fore end extending towards the said camera.

In order to acquire the clear and high image quality by using this invention, it demands placing the rotational axis of the convex mirror, the rotational axis of the transparent cylinder and the optical axis of the camera on the same line.

The shape of the tapered object does not have to be specified, for instance, its shape can be like a column, a thin conical shape or a transacted conical shape. All the same, the shape would be better to be conical due to the smaller disturbance to the site of the camera than any other shapes.

In addition to this, it would be better to have an anti-reflective finish on the surface of the object in order to prevent internal reflection of the light raised on the object. Otherwise the object causes internal reflection.

There is no restriction on the shape of the convex mirror as long as it is shaped as rotationally symmetrical and having a straight or curved ridgeline (i.e. quadratic curve or circular arc etc).

The general concrete construction of this invention is as follows.

One end of the transparent cylinder is fixed on the outer periphery or close to the convex mirrors and the other end of the cylinder is fixed on the camera via the joint device, at the centre of which the hole for passing through the light is opened. In order to avoid the disturbance to the view of the camera due to the said tapered object, its shape would be better to be conical. Furthermore, the size of the cone is set to be the same or smaller than the cone, which has a base circle 'x' and the vertex 'y'. The circle 'x' is a projection of the hole opened in the joint on the surface of the convex mirror, and the vertex 'y' is positioned at the first principal point of the camera.

The rays of light coming from any 360° direction towards the convex mirror are reflected by the mirror, then they are gathered to the lens of the camera by using this invented device.

As it is explained before, the rays of light, which reach to the camera by reflection on the convex mirror after reflecting on the inner surface of the transparent cylinder, intersect the production line of the rotational axis of the mirror if both the rotational axes of the convex mirror and the transparent cylinder coincide with each other.

Thus, the device manufactured according to this invention can eliminate all the unwanted rays of light, which cause the internal reflection. Hence it provides clear and high quality image.

DETAILED DESCRIPTION OF THE INVENTION

Figure 1:
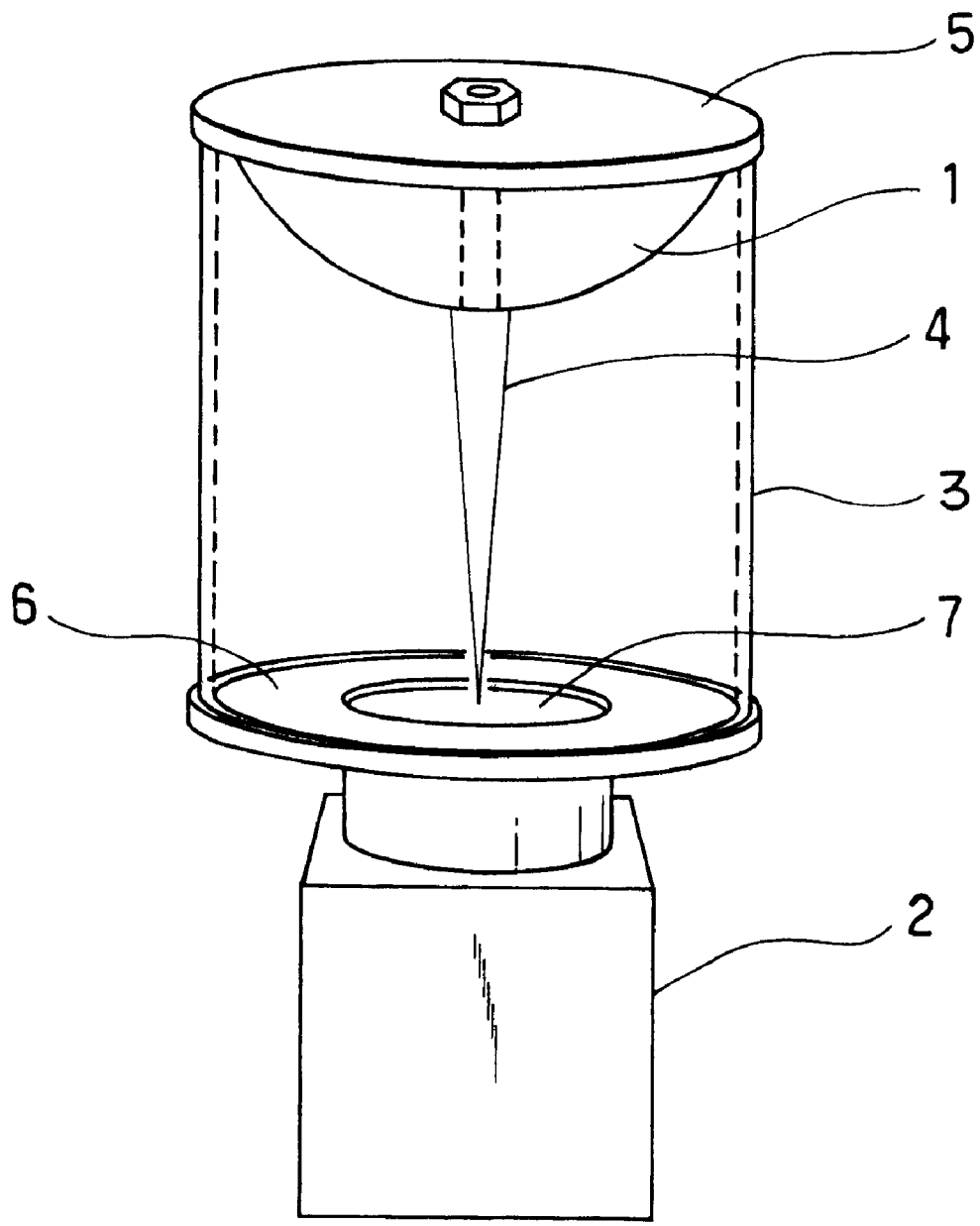
FIG. 1 is the perspective of the omnidirectional vision sensor embodying this invention.
Figure 2:
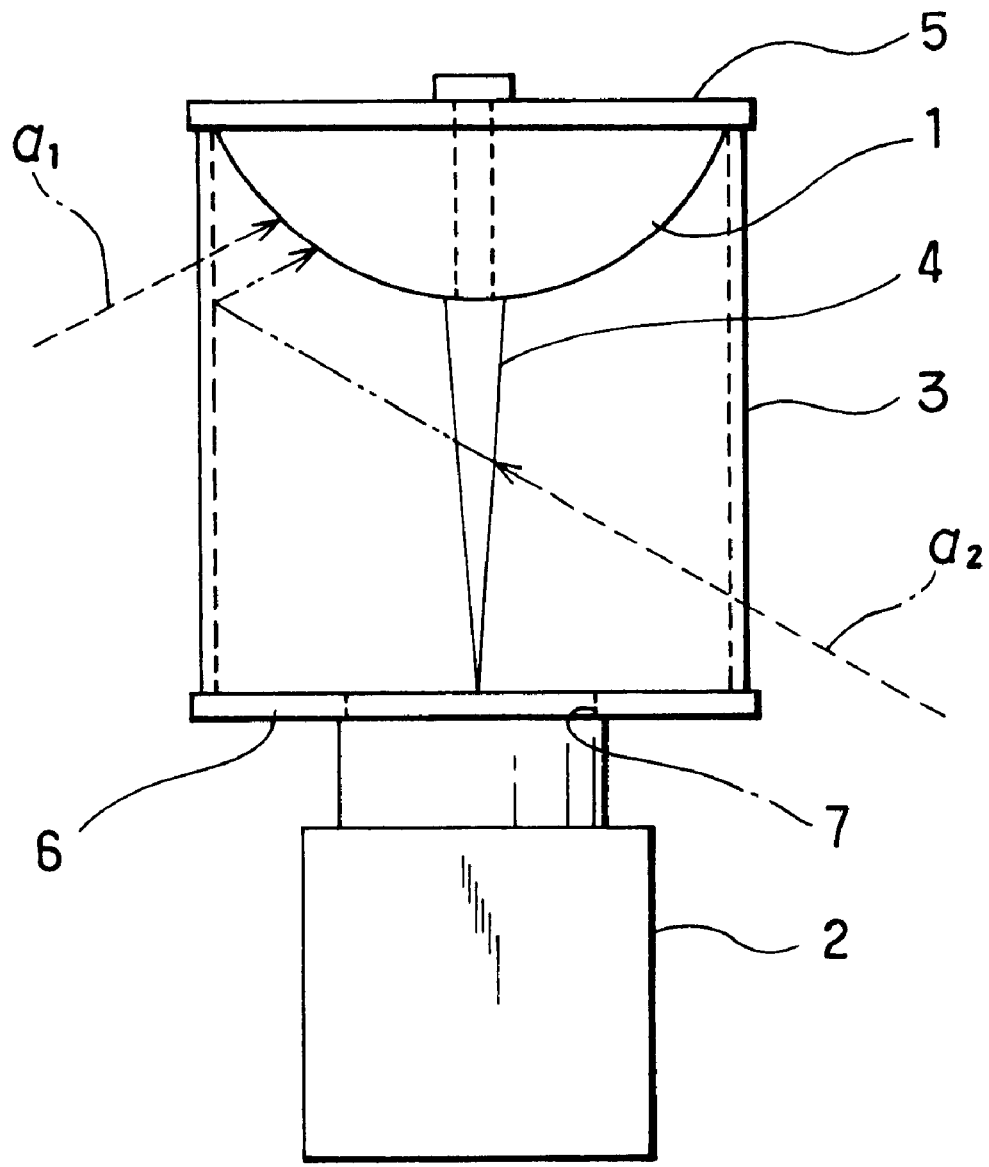
FIG. 2 is the elevation of the device indicated on FIG. 1.
Figure 3:
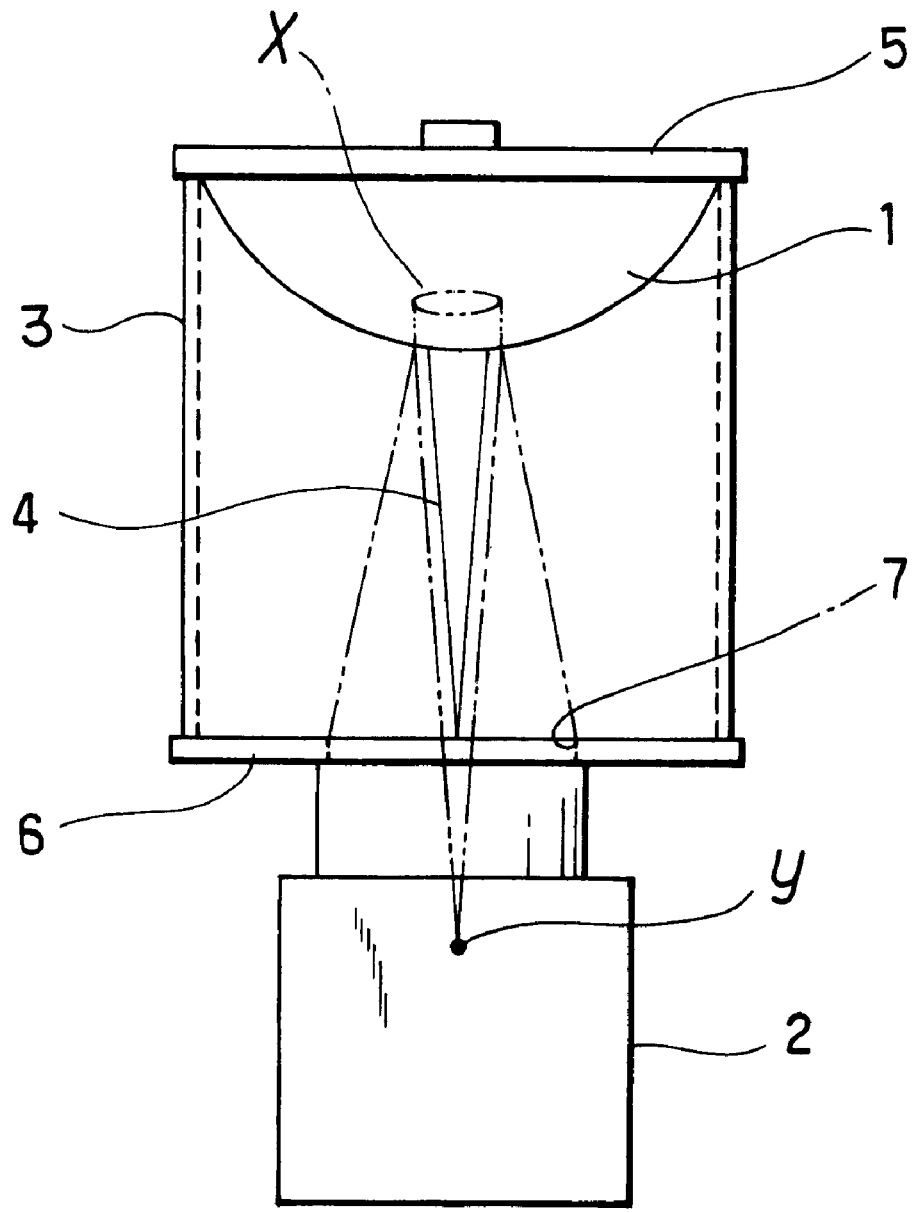
FIG. 3 is the section that describes the demanded position to place of the tapered object.

The FIGS. 1, 2 and 3 indicates a desirable example of the omnidirectional vision sensor and each of FIGS. 1, 2 and 3 represents the perspective, elevation and section respectively.

The number 1, 2 and 3 in each figure represents rotationally symmetrical convex mirror, the camera which is positioned opposite to the convex mirror and the transparent cylinder which joins both the 'convex mirror 1' and 'camera 2' respectively.

The 'convex mirror 1' is a composition of the material such as glass, metal or plastic, and it is fixed to the 'cylinder 3' via a 'support 5'. The production of the optical axis of the 'camera 2' coincide with the rotational axis of the 'mirror 1' and it is fixed at the 'cylinder 3'.

The 'cylinder 3' is a composite of transparent glass or plastic and it surrounds the 'convex mirror 1'. Furthermore, both the 'convex mirror 1' and the 'cylinder 3' are set to have common rotational axes.

The 'support 5' is held by this 'cylinder 3'. Consequently, 'cylinder 3' supports a 'camera 2' via a 'joint device 6' which occupies a 'window 7'.

The shape of this cylinder varies and it does not have to be a cylindrical shape as shown on this operational example on this report.

The 'joint device 6', which is shaped like a ring, with a hole inside is to be attached on the edge of the lens of the 'camera 2'. The size of the circular hole on the 'joint 6' namely 'window 7' is best to be big enough to not disturb the site of the 'camera 2'.

The anti-internal reflection device, the tapered object namely 'centre needle' hereinafter. The 'centre needle 4' is placed along the production line of the symmetry axis of the 'convex mirror 1' in the instrument described above. This device has its own base on the surface of the 'convex mirror 1' and it is pointed towards the 'camera 2'.

This 'centre needle 4' is to eliminate any rays of light which cause internal reflection on the inner surface of the 'cylinder 3'. Furthermore, the rotational axis of the 'centre needle 4' coincide with the rotational axis of the 'convex mirror 1' and the optical axis of the 'camera 2' (i. e. these 3 axes are on same straight line).

The 'centre needle 4' has a thin conical shape and its own base is on the 'convex mirror 1'. Furthermore, the surface of the 'centre needle 4' is best to have an anti-reflection finish, for instance, painted with a dark colour or ground coating, due to the purpose of having a 'centre needle 4' to prevent internal reflection.

The shape of the 'centre needle 4' does not have to be specified, for instance, it could be shaped like a column, a thin conical shape or a transacted conical shape. Although, the shape is best to be a conical due to the smaller disturbance of the site for the camera than other shapes.

In order to require the minimum disturbance to the camera, the shape and the size of the 'centre needle 4' demand to be the same or smaller than the cone which has a base circle 'x', the projection of the 'window 7' on 'convex mirror 1' and which has a vertex 'y' positioned at the first principal point of the camera.

The edge of the 'centre needle 4' (the vertex of the 'centre needle 4' drawn on FIG. 1, 2 and 3) is better to be extended to or close to the 'window 7' of the 'joint 6'. The position of the edge is not restricted as described above, as long as it can eliminate the rays of light, which causes internal reflection.

Figure 4:
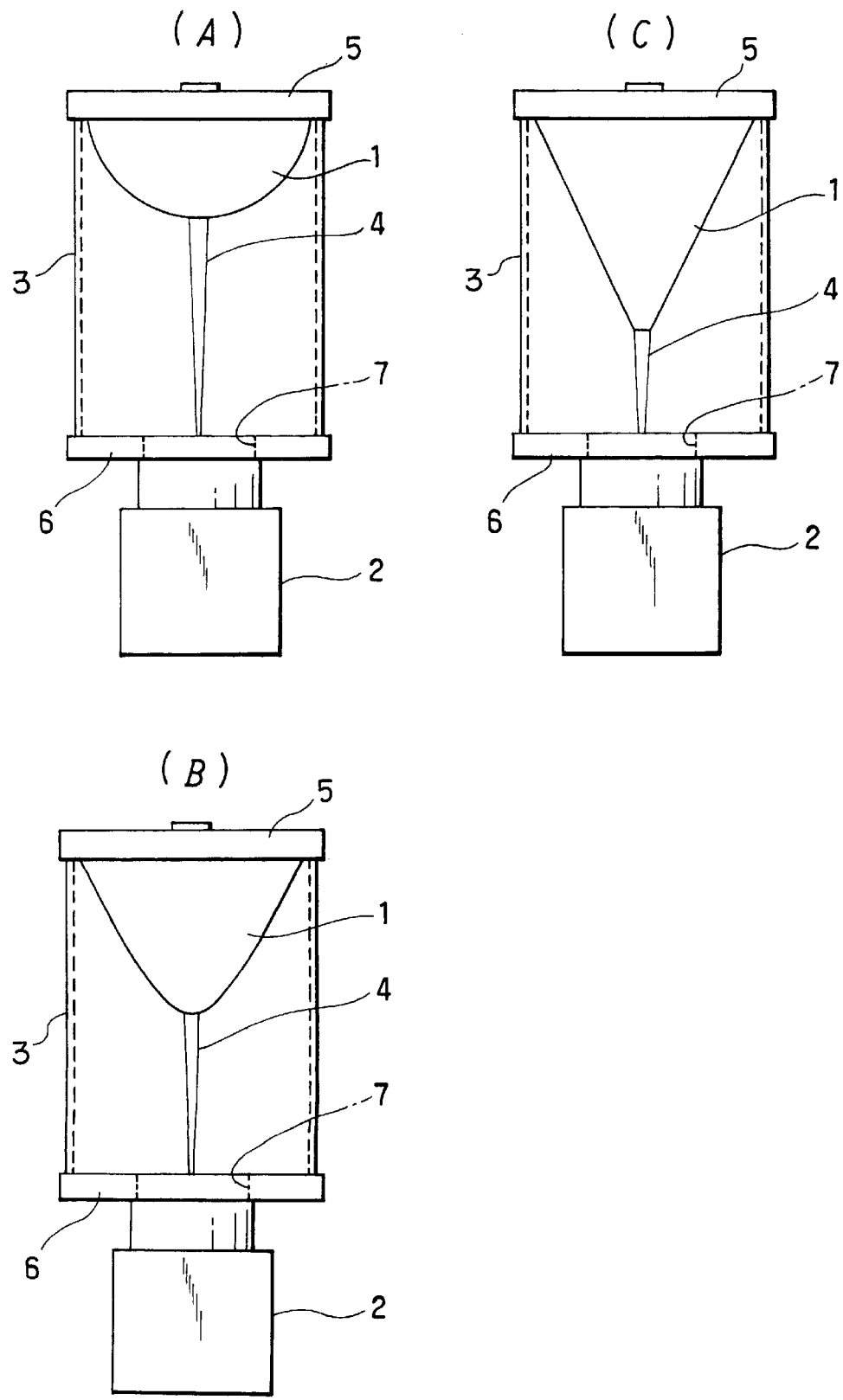
FIG. 4(A), 4(B), and 4(C) are the sections that show another application of this invention.

There is no restriction on the shape of the rotationally symmetrical convex mirror as long as its ridgeline is straight or curved (i.e. circular arc or quadratic curve etc). (A), (B) and (C) on FIG. 4 gives examples of the different shapes of the convex mirror.

The FIG. 4(A) shows a device with smaller curvature compared with the ones shown on FIG. 1, 2 and 3.

The FIG. 4(B) is a device with a convex mirror, which has a quadratic curve ridgeline.

The FIG. 4(C) shows the device with a convex mirror, which has a straight ridgeline.

Otherwise, the descriptions of other components drawn on FIG. 4 are exactly the same as the ones for FIG. 1, 2 and 3. Thus, those detailed descriptions are omitted.

Figure 5:
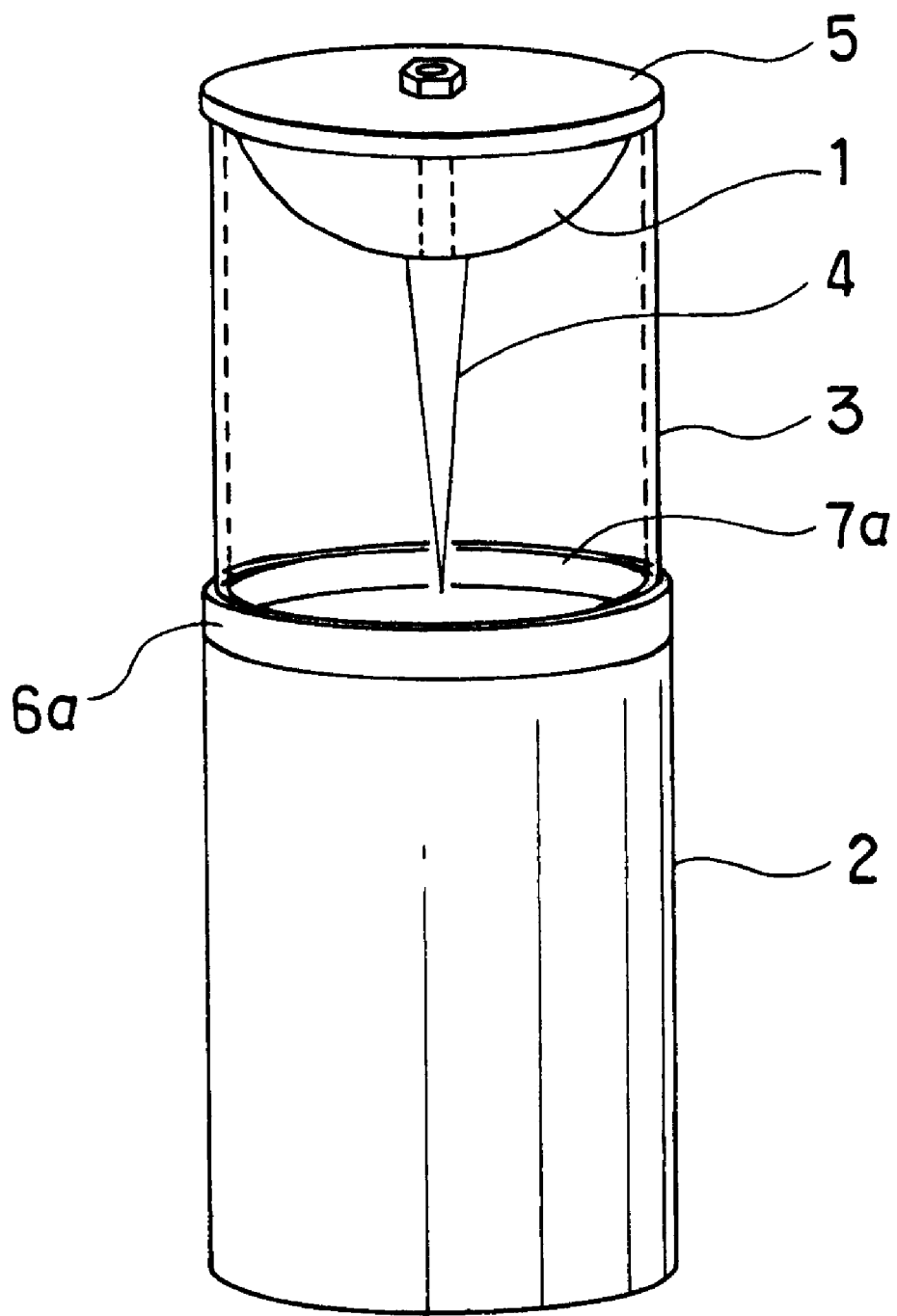
FIG. 5 is perspective that shows another application of this invention.
Figure 6:
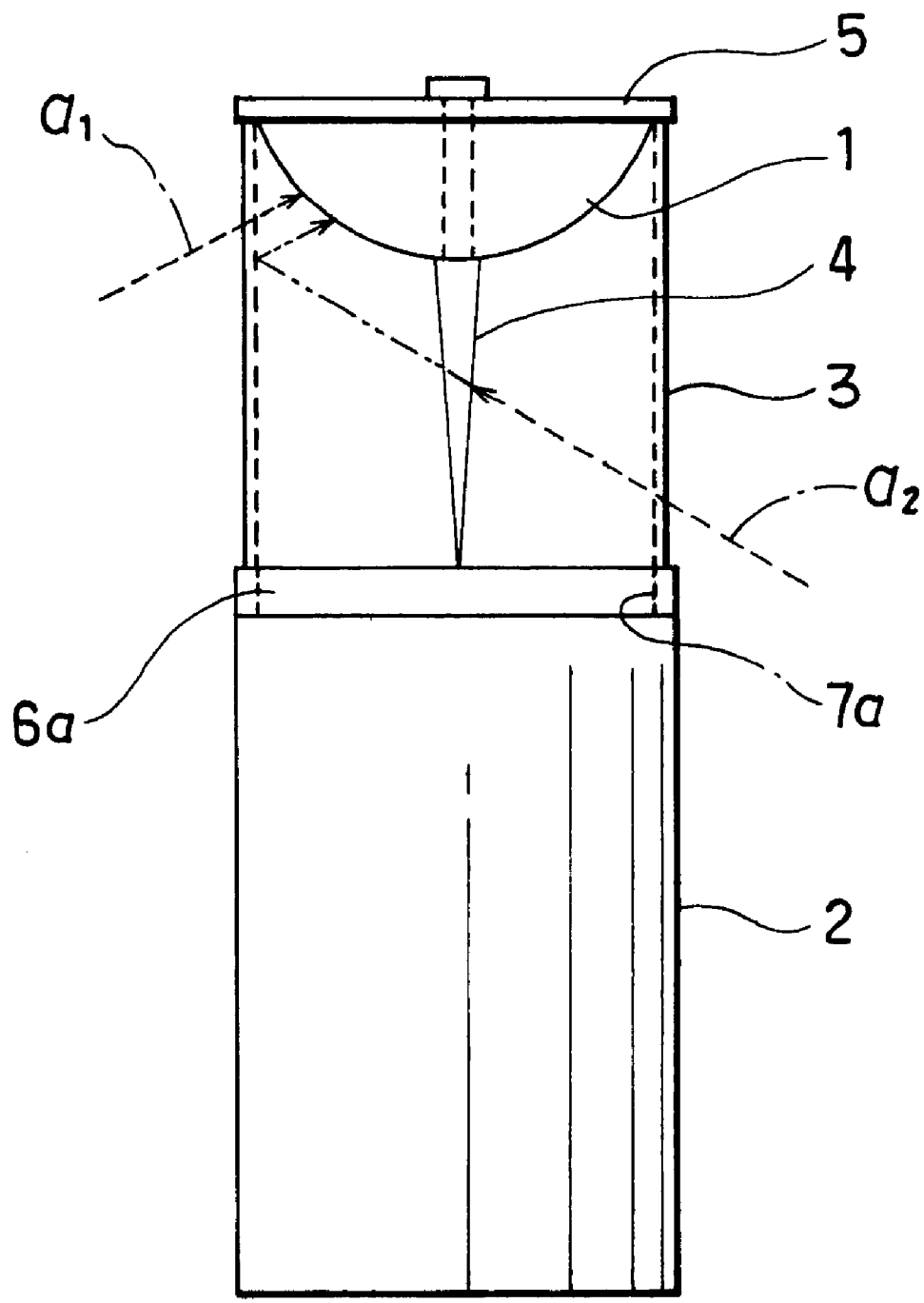
FIG. 6 is the section of the device which described in FIG. 5

The FIGS. 5 and 6 are another example of the use of this invention.

The outer radius of the 'convex mirror 1' in FIGS. 5 and 6 is set to be the same length as the radius of the lens of the 'camera 2'. The 'camera 2' is fixed on to the 'transparent cylinder 3' via the 'joint 6a' which contains the 'window 7a'.

Furthermore, the recommended condition of settings about the 'centre needle 4' is the same as the one described for FIG. 1, 2 and 3.

The shape and the size of the 'centre needle 4' is recommended to be the same or smaller size than the cone which has a base circle 'x', the projection of the 'window 7' on the 'convex mirror 1', and the vertex 'y' of the cone at the first principal point of the 'camera 2' as explained before.

Otherwise, the descriptions of other components drawn on FIG. 4 are exactly the same as the ones for FIG. 1, 2 and 3. Thus, those detailed descriptions are omitted.

The use of this 'omnidirectional vision sensor' invention can be varied such as placing it up side down.

The rays of light $a_1$, in FIGS. 5 and 6, which come from any 360° direction around the optical axis of the camera pass through the transparent cylinder then hit the convex mirror, and the reflected rays are gathered on to the camera 2 in this invention. Consequently, the rays of light $a_2$ which internally reflect on the inner surface of the cylinder and reaches to the 'convex mirror 1', passes through on the product of the rotational axis of the convex mirror.

Provided the axes of both 'convex mirror 1' and the 'transparent cylinder 3', are coincident with each other. Therefore, the rays of light $a_2$, which internally reflect inside the cylinder and reaches the convex mirror, are eliminated by the 'centre needle 4' completely. Since, this invention can prevent the rays of light, which internally reflect inside the cylinder, completely.

Then no rays of light reflected on inside of the 'transparent cylinder 3' can be taken in the 'camera 2' at all.

What is claimed is:

1. An omnidirectional vision sensor comprising a rotationally symmetrical convex mirror having a vertex and a center axis, a camera positioned opposite to said vertex of said convex mirror, a transparent cylinder having a center axis and connecting said camera and said mirror, and a tapered object which is connected to said vertex of said convex mirror and placed along said center axis of said convex mirror, wherein said center axis of said cylinder and said center axis of said convex mirror substantially coincide with each other.

2. The omnidirectional vision sensor of claim 1, wherein said convex mirror has a straight or curved ridgeline.

3. The omnidirectional vision sensor of claim 1, wherein said camera has an optical center axis, said tapered object has a center axis, and wherein said optical center axis, said center axis of said mirror and said center axis of said tapered object substantially coincide with each other.

4. The omnidirectional vision sensor of claim 1, wherein said tapered object is conically shaped, and has a base on said convex mirror.

5. The omnidirectional vision sensor of claim 1, wherein said tapered object has a surface having an anti-reflective finish.

6. The omnidirectional vision sensor of claim 1, wherein said convex mirror has a straight or curved ridgeline, said camera has an optical axis, and said tapered object has a center axis, and wherein said center axis of said mirror, said optical axis of said camera, and said central axis of said tapered object substantially coincide with each other, and wherein said tapered object is conically shaped and has a base on said convex mirror.

7. The omnidirectional vision sensor of claim 1, wherein said convex mirror has a straight or curved ridgeline, said camera has an optical axis, and said tapered object has a center axis, and wherein said center axis of said mirror, said optical axis of said camera, and said central axis of said tapered object substantially coincide with each other, and wherein said tapered object has a surface having an anti-reflective finish.

8. The omnidirectional vision sensor of claim 1, wherein said convex mirror has a straight or curved ridgeline, said camera has an optical axis, and said tapered object has a center axis, and wherein said center axis of said mirror, said optical axis of said camera, and said central axis of said tapered object substantially coincide with each other, and wherein said tapered object is conically shaped having a base on said convex mirror, and having a surface having an anti-reflective finish.

9. The omnidirectional vision sensor of claim 1, wherein said transparent cylinder has a first end and a second end, and is fixed at said first end to the outer periphery of said convex mirror and is fixed at said second end to said camera via a joint, said joint having a central hole for the passage of light rays.

10. The omnidirectional vision sensor of claim 9, wherein said transparent cylinder has a window and said camera has a first principal point, and wherein said tapered object is shaped conically and is the same size as or smaller than a cone defined by a base circle "x" which is a projection of said window on the surface of said convex mirror and by a vertex "y" positioned at said first principal point of said camera.

11. The omnidirectional vision sensor of claim 9, wherein said convex mirror has a straight or curved ridgeline, said camera has an optical axis, and said tapered object has a center axis, and said center axis of said mirror, said optical axis of said camera, and said center axis of said tapered object substantially coincide with each other, and said tapered object is conically shaped having a base on said convex mirror.

12. The omnidirectional vision sensor of claim 11, wherein said transparent cylinder has a window and said camera has a first principal point, and wherein said tapered object is shaped conically and is the same size as or smaller than a cone defined by a base circle "x" which is a projection of said window on the surface of said convex mirror and by a vertex "y" positioned at said first principal point of said camera.

13. The omnidirectional vision sensor of claim 9, wherein said convex mirror has a straight or curved ridgeline, said camera has an optical axis, and said tapered object has a center axis, and said center axis of said mirror, said optical axis of said camera, and said center axis of said tapered object substantially coincide with each other, and said tapered object has a surface having an anti-reflective finish.

14. The omnidirectional vision sensor of claim 13, wherein said transparent cylinder has a window and said camera has a first principal point, and wherein said tapered object is shaped conically and is the same size as or smaller than a cone defined by a base circle "x" which is a projection of said window on the surface of said convex mirror and by a vertex "y" positioned at said first principal point of said camera.

15. The omnidirectional vision sensor of claim 9, wherein said convex mirror has a straight or curved ridgeline, said camera has an optical axis, and said tapered object has a center axis, and said center axis of said mirror, said optical axis of said camera, and said center axis of said tapered object substantially coincide with each other, and said tapered object is conically shaped having a base on said convex mirror, and has a surface having an anti-reflective finish.

16. The omnidirectional vision sensor of claim 15, wherein said transparent cylinder has a window and said camera has a first principal point, and wherein said tapered object is shaped conically and is the same size as or smaller than a cone defined by a base circle "x" which is a projection of said window on the surface of said convex mirror and by a vertex "y" positioned at said first principal point of said camera.

* * * * *